United States Patent
Crippa (10) Patent No.: US 6,694,794 B2
(45) Date of Patent: Feb. 24, 2004

(54) DRAW-BENDING MACHINE

(75) Inventor: Aurelio Crippa, Arosio (IT)

(73) Assignee: Fabbrica Macchine Curvatubi Crippa Agostino S.p.A., Arosio (IT)

( * ) Notice: Subject to any disclaimer, the term of this patent is extended or adjusted under 35 U.S.C. 154(b) by 0 days.

(21) Appl. No.: 10/246,614

(22) Filed: Sep. 17, 2002

(65) Prior Publication Data

US 2003/0061853 A1 Apr. 3, 2003

(30) Foreign Application Priority Data

Oct. 2, 2001 (EP) .............................. 01830619

(51) Int. Cl.⁷ .............................................. B21D 7/024
(52) U.S. Cl. ........................................ 72/307; 72/149
(58) Field of Search ...................... 72/307, 149, 159, 72/306, 388

(56) References Cited

U.S. PATENT DOCUMENTS

| | | |
|---|---|---|
| 3,299,681 A | 1/1967 | Hautau |
| 4,945,747 A | 8/1990 | Yogo |
| 5,099,669 A * | 3/1992 | Del Fabro ............... 72/307 |
| 5,291,771 A * | 3/1994 | Tomo et al. ............ 72/306 |
| 5,927,126 A * | 7/1999 | Biella .................... 72/149 |

FOREIGN PATENT DOCUMENTS

| | | | |
|---|---|---|---|
| DE | 3620151 | 2/1987 | |
| DE | 3620151 A1 * | 2/1987 | ............ 72/306 |
| EP | 0 538 207 | 10/1992 | |
| EP | 1 065 015 | 6/2000 | |
| GB | 2 187 666 | 3/1987 | |
| JP | 2-299724 * | 12/1990 | ............ 72/306 |

* cited by examiner

Primary Examiner—Daniel C. Crane
(74) Attorney, Agent, or Firm—Pearne & Gordon LLP (57) ABSTRACT

A draw-bending machine comprises a base frame (2), a bending head (3) movably in engagement with the base frame (2), a support and positioning device (9) for the bending head (3), and handling and locking means (51) of a pipe (6) to be bent. The support and positioning device (9) consists of a first support arm (10) movable relative to the base frame (2) and a second support arm (17) having a first end (17a) hinged on an end (10a) of the first support arm (10) and a second end (17b) hinged on the bending head (3). The handling and locking means (51) comprises a first gripping unit (25) adapted to shift the pipe (6) to an operating space that can be reached by the bending head (3).

25 Claims, 13 Drawing Sheets

DRAW-BENDING MACHINE

FIELD AND BACKGROUND OF THE INVENTION

The present invention relates to a draw-bending machine.

It is known that bent metal pipes are used in many application fields. For example, in the motor-vehicle industry pipes provided with a plurality of bends are used for making hydraulic and pneumatic circuits in cars and motorcycles. In particular for the braking and/or conditioning system or also for the cooling system of a motor.

In many cases accomplishment of several bends close to each other is required, which bends are disposed in different planes on pipes formed of two metal portions, usually made of aluminium, connected to each other by a flexible stretch, made of rubber for example.

In the known art, accomplishment of these bends is possible before assembling of the three portions forming the finished pipe.

Consequently, the resulting production cycle necessarily requires accumulation of the already bent metal portions waiting for being assembled, which may involve possible damage of said portions during transportation, storage or picking up of same from the magazine. In addition, due to the necessary accumulation of the semi-finished parts, availability of important spaces to store them is required.

Furthermore, since pipes must be submitted to tightness tests after being assembled, since they are not assembled before bending, use of complicated and expensive testing apparatus are involved which must suit the different shapes of the already bent pipes.

Draw-bending machines are known that enable accomplishment of bends in distinct planes on pipes formed of a single rigid portion.

They comprise pipe-locking and rotation means which is capable of causing forward movement of the pipe to be bent along a direction coincident with the longitudinal axis of the pipe and rotating the same around its own axis, and a bending head movable along two mutually perpendicular directions lying in a plane perpendicular to said advancing direction. The head comprises a bending die adapted to engage and disengage the pipe through combination of movements along the two perpendicular directions.

After carrying out a first bend, the head is moved away from the pipe, the pipe is caused to move forward and rotate to change the bending plane and the die is approached again for execution of a second bend.

Such a type of machine is known from document EP0538207 in the name of the same Applicant.

It comprises a base structure on which the supporting, rotation and locking members of a pipe to be bent are mounted in cantilevered fashion. Linked to the base structure is a bending head comprising a first slide movable on first horizontal sliding guides integral with the base structure and a second slide slidably in engagement with the first slide by means of vertical sliding guides integral with said first slide. Two bending dies disposed spaced apart from each other at a superposed position can be positioned on the second slide.

It is also known from document U.S. Pat. No. 4,945,747 an apparatus for bending elongated materials in any direction which includes a chucking unit, an arm robot having at least three swiveling arm segments, a bending head provided on a free end of the arm segment and a moving device for moving the robot along a line parallel to the chucked material.

The machines of the known art briefly illustrated above do not allow pipes consisting of a flexible central portion to be dealt with.

In fact, for changing the bending plane they cause rotation of the pipe about its own axis; this operation is much more complicated, if not impossible, where the pipe is provided with a median rubber portion, because the latter tends to flex and twist.

SUMMARY OF THE INVENTION

Under this situation the technical task underlying the present invention is to conceive a draw-bending machine capable of obviating the mentioned drawbacks.

In particular, it is an aim of the present invention to conceive a draw-bending machine enabling bends to be easily executed in different planes on two rigid metal portions of a pipe provided with a median flexible stretch.

It is a further aim of the present invention to provide a draw-bending machine adapted to easily handle the pipes from loading of same onto the machine until unloading therefrom without external interventions being required.

The technical task mentioned and the aims specified are achieved by a draw-bending machine comprising: a base frame; a bending head movably in engagement with the base frame and including at least one bending die rotatable about a bending axis; a support and positioning device of said at least one bending head, said support and positioning device being linked to the base frame; handling and locking means for a pipe to be bent; the support and positioning device of said at least one bending head presenting: a first support arm movably in engagement with the base frame, said first support arm having a first end and a second end opposite to the first one; first actuating means of the first support arm; second actuating means of the first support arm; a second support arm having a first end hinged on the first end of the first support arm at a first articulation axis and a second end hinged on the bending head at a second articulation axis; third actuating means of the second support arm around the first articulation axis; fourth actuating means of the bending head around the second articulation axis; the draw-bending machine being characterized in that the handling and locking means for the pipe to be bent comprises a first gripping unit having a first and a second clamps aligned along a first alignment direction to tighten the pipe to be bent at two regions spaced apart from each other.

BRIEF DESCRIPTION OF THE DRAWINGS

Description of four preferred but not exclusive embodiments of a draw-bending machine in accordance with the invention is now given by way of non-limiting example and illustrated in the accompanying drawings, in which.

DESCRIPTION OF THE PREFERRED EMBODIMENTS

With reference to the drawings, the draw-bending machine in accordance with the invention is identified by reference numeral 1.

It comprises a base frame 2 with which a bending head 3 is movably in engagement.

Figure 3:
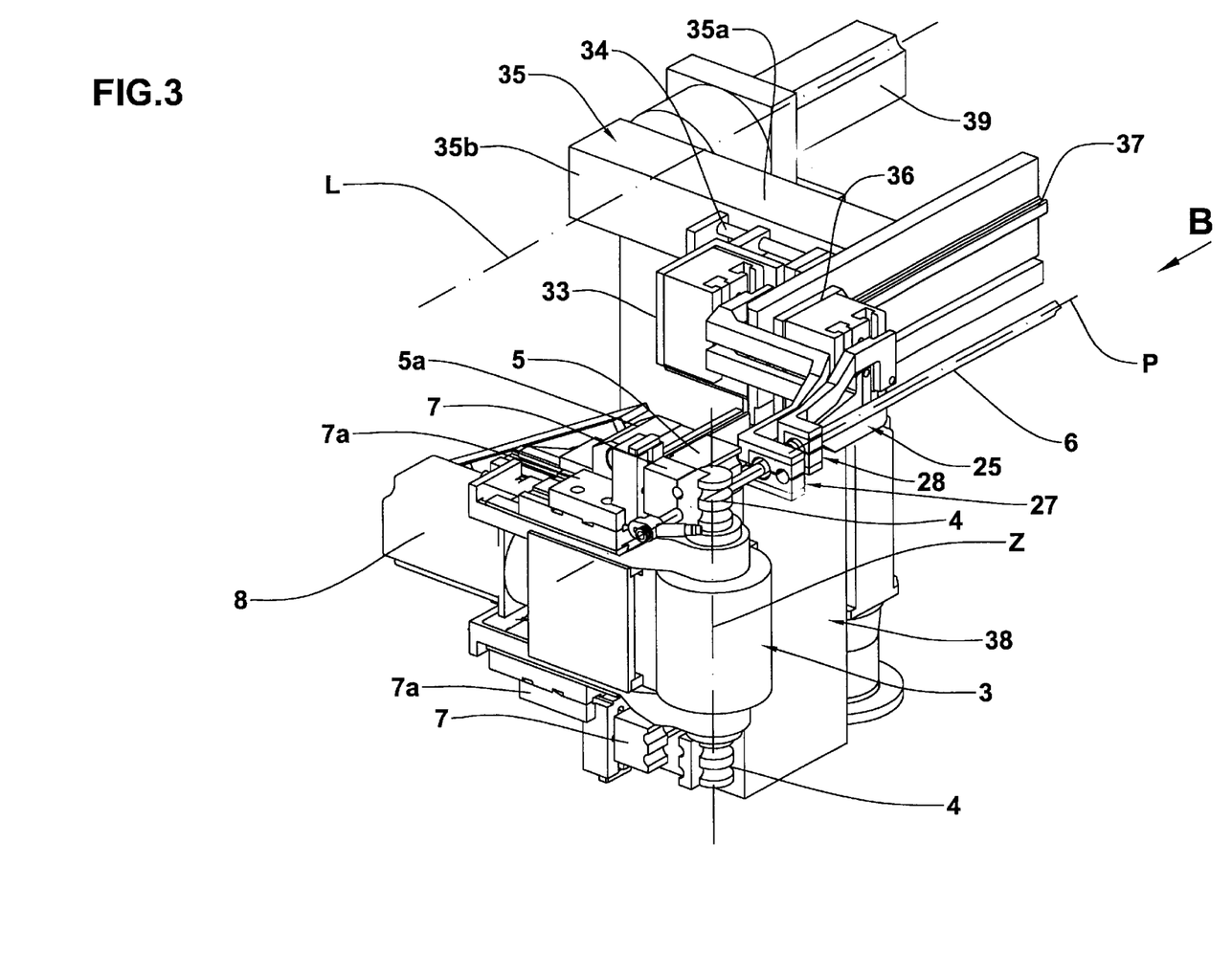
FIG. 3 is a perspective view of a first detail to an enlarged scale of the machine portion shown in FIG. 2 before bending of the pipe.
Figure 4:
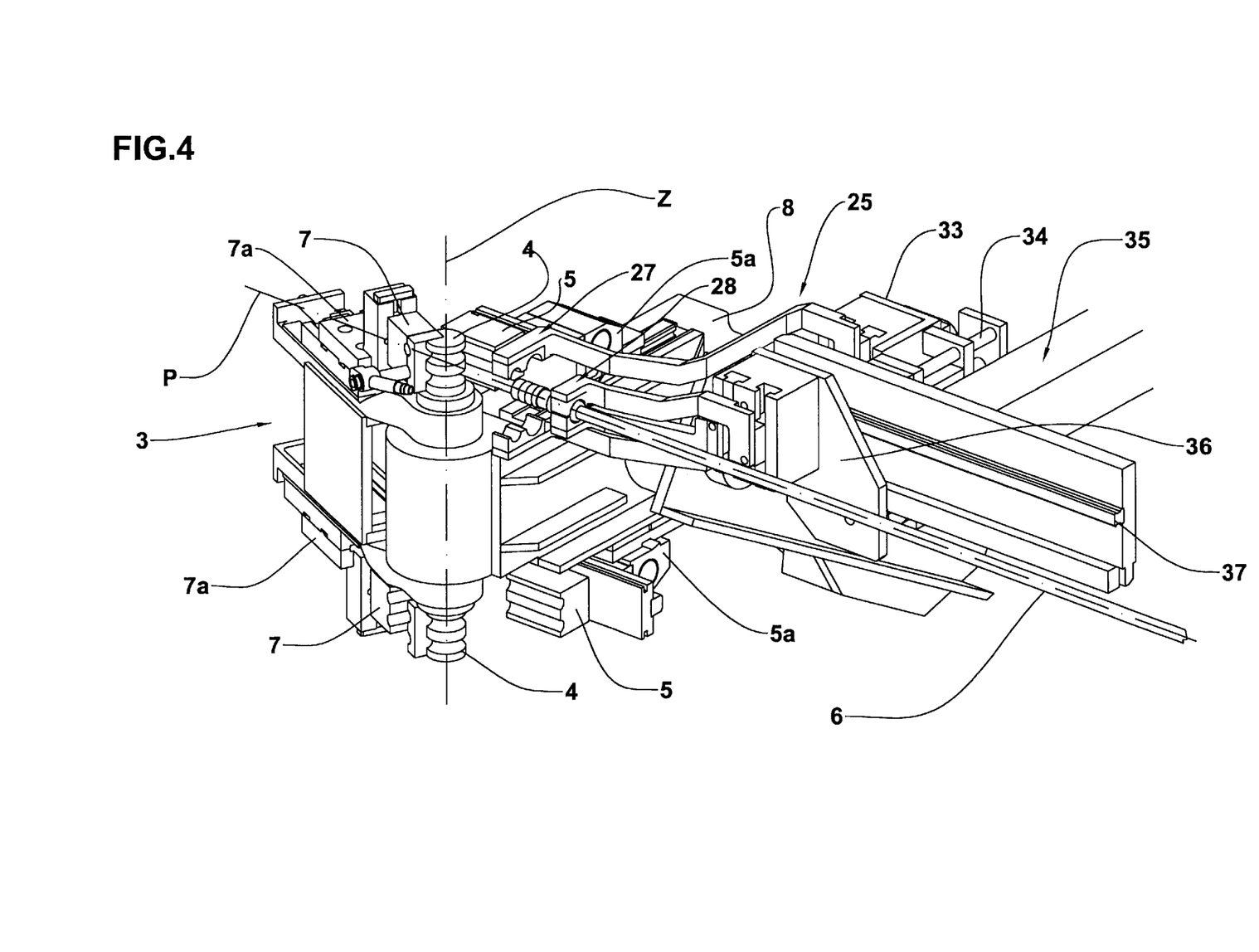
FIG. 4 shows the same detail as in FIG. 3, after bending of the pipe, seen according to arrow B in FIG. 3.

The bending head 3 comprises at least one bending die 4 and one presser element 5 active on a pipe 6 to be bent against the action of said die 4 (FIGS. 3 and 4). Said head 3 further comprises at least one locking jaw 7 to press and lock pipe 6 against die 4. The locking jaw 7 is rotatably movable relative to the presser element 5 together with die 4, at a bending axis Z.

For the sake of clarity, by bending axis Z it is intended the axis around which pipe 6 is bent.

Rotation of the die 4 and locking jaw 7 relative to the presser element 5 carried out by appropriate rotation means 4, allows bending of pipe 6.

In order to release pipe 6 after bending, both the locking jaw 7 and presser element 5 are mounted on respective slides 7a, 5a enabling movement between first positions in which the jaw 7 and presser element 5 are spaced apart from die 4 and second positions in which the same are disposed close to die 4 to tighten the pipe 6 to be bent.

Advantageously, the bending head 3 is provided with two dies 4 disposed spaced apart from each other along the bending axis Z and each provided with a presser element 5 and a locking jaw 7.

The machine 1 further comprises a support and positioning device 9 for the head 3 which is linked to the base frame 2 (FIGS. 1, 9, 11 and 13).

The support and positioning device 9 is made up of a first support arm 10 movably in engagement with the base frame 2 by appropriate first 11 and second 12 actuating means.

In a first embodiment, clearly shown in FIGS. 1, 2, 7 and 8, the first support arm 10 is moved by the first 11 and second 12 actuating means along a first translation direction X and a second translation direction Y perpendicular to the first one X, respectively.

In particular, the first support arm 10 is mounted on first sliding guides 13 oriented along the first translation direction X which is horizontal to the resting surface of the base frame 2, and formed on a first slide 14. The first slide 14 is in turn in engagement with second vertical sliding guides 15 oriented along the second translation direction Y and integral with a support body 16 mounted on the base frame 2.

The first arm is therefore movable in a vertical plane defined by two translation directions X, Y along which the first 11 and second 12 actuating means are operatively active.

Consecutively hinged on a first end 10a of the first support arm 10, at a first articulation axis J, is a second support arm 17.

Advantageously, the second arm 17 is driven by third actuating means 18 and can take a plurality of angular positions relative to the first support arm 10.

Figure 2:
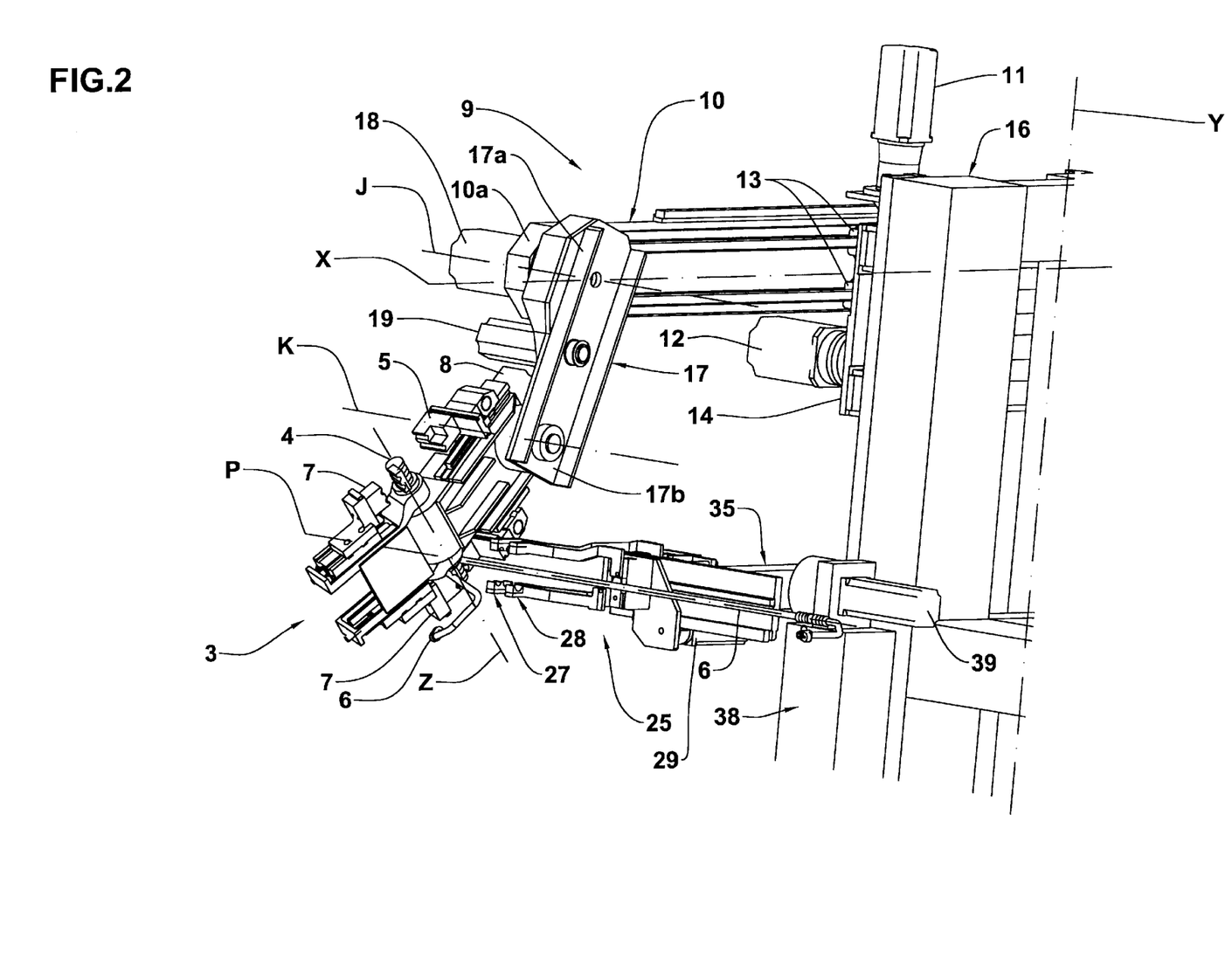
FIG. 2 is a perspective view of an enlarged portion of the machine seen according to arrow A in FIG. 1.

In more detail, as clearly shown in FIG. 2, the second arm 17 has a first end 17a connected to the first support arm 10 and a second end 17b rotatably linked to the bending head 3 at a second articulation axis K; the bending head 3 is therefore mounted in cantilevered fashion with respect to the support body 16.

In addition, fourth actuating means 19 operatively active between the second arm 17 and bending head 3 enables relative positioning between the two elements.

According to the first embodiment shown, the first and second articulation axes J, K are parallel to each other and in addition they are perpendicular to both the first X and second Y translation directions.

The bending axis Z is then perpendicular to both the articulation axes J, K and therefore said axis Z lies in a vertical plane parallel to the two translation directions X, Y, irrespective of the movements carried out by the support arms 10, 17 and the head 3 itself.

Figure 9:
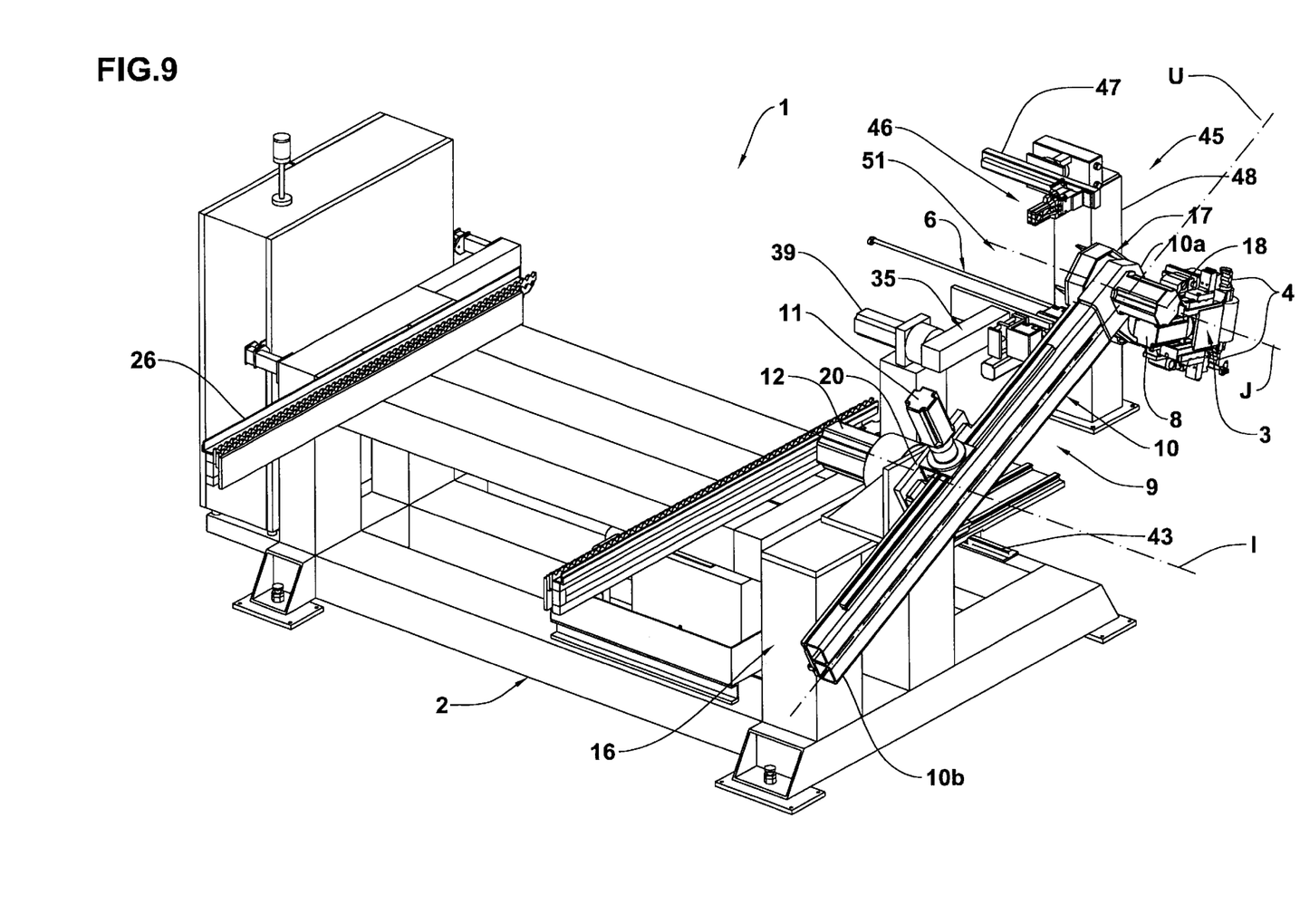
FIG. 9 is a perspective view of a second embodiment of the draw-bending machine in accordance with the invention, seen according to arrow C in FIG. 1.
Figure 10:
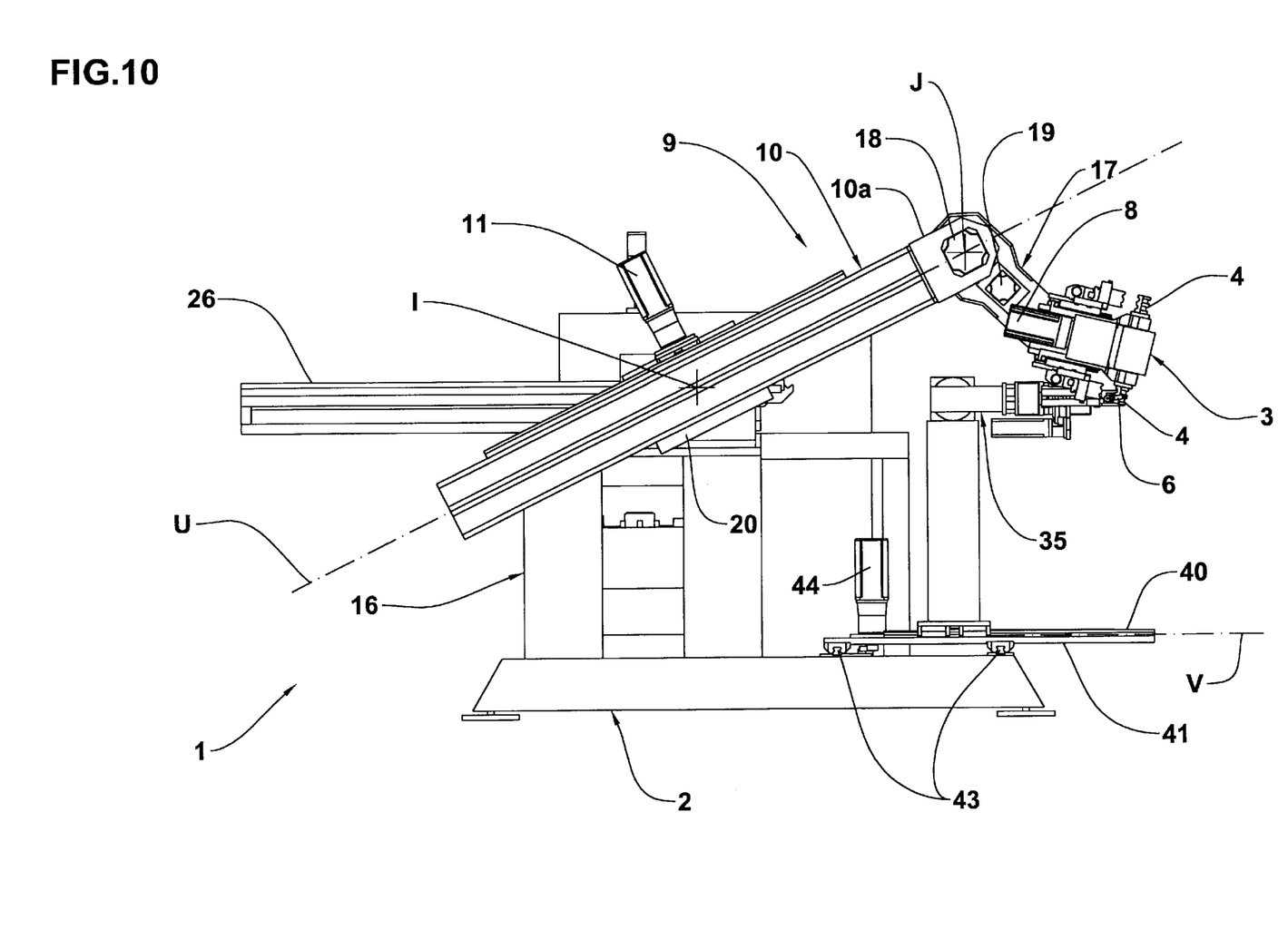
FIG. 10 is a partial elevation and side view of the machine in FIG. 9.

Alternatively, in a second embodiment shown in FIGS. 9 and 10, the first support arm 10 is movable relative to the base frame 2 around a rotation axis I and in a translation direction U coincident with the longitudinal extension of the first support arm 10 and perpendicular to the rotation axis I itself.

In particular, the first arm 10 is mounted on sliding guides, similar to those of the first embodiment and not shown, formed in a rotating plate 20. The rotating plate 20 is in turn hinged on the support body 16 mounted on the base frame 2.

The first actuating means 11 is operatively active along a translation direction U to move the first support arm 10 on the sliding guides provided in plate 20, whereas the second actuating means 12 is operatively active around the rotation axis I, to rotate the rotating plate 20 together with the first arm 10.

Advantageously, the rotation axis I is horizontal relative to the resting surface of the base frame 2, and consequently the first support arm 10 is movable in a vertical plane perpendicular to the rotation axis I itself.

As in the first embodiment, the second support arm 17 is rotatably connected to the first end 10a of the first arm 10 at the first articulation axis J that in the second embodiment shown is parallel to the rotation axis I.

For details concerning arrangement of the bending head 3 relative to the second support arm 17 reference is to be made to the already described first embodiment.

Thus, the first and second articulation axes J, K are parallel to each other and in addition they are parallel to the rotation axis I.

Furthermore, the bending axis Z is perpendicular to the rotation axis I and therefore said axis Z lies in a vertical plane perpendicular to the three axes I, J, K, irrespective of the movements carried out by the support arms 10, 17 and head 3.

Figure 11:
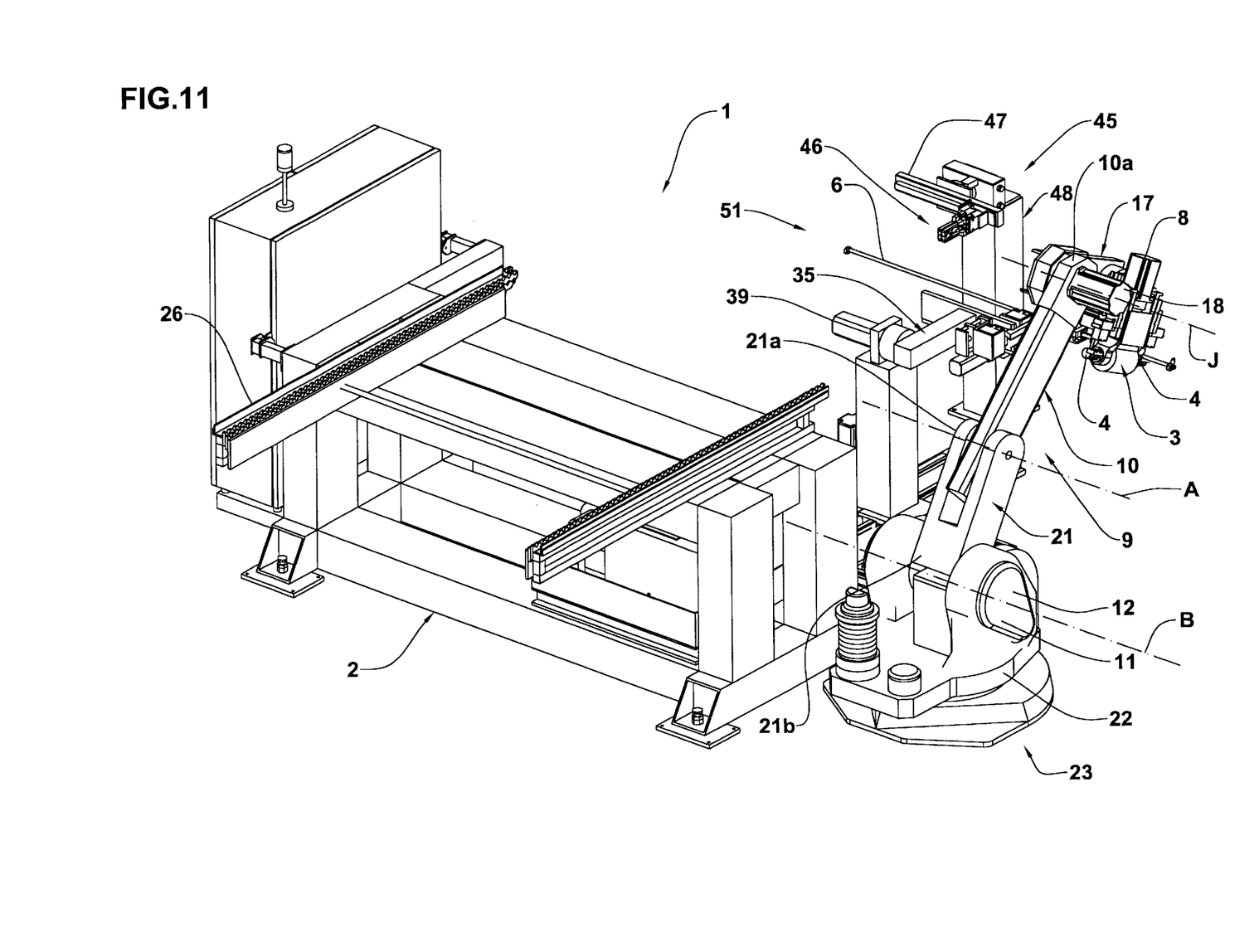
FIG. 11 is a perspective view of a third embodiment of the draw-bending machine in accordance with the invention, seen according to arrow C in FIG. 1.
Figure 12:
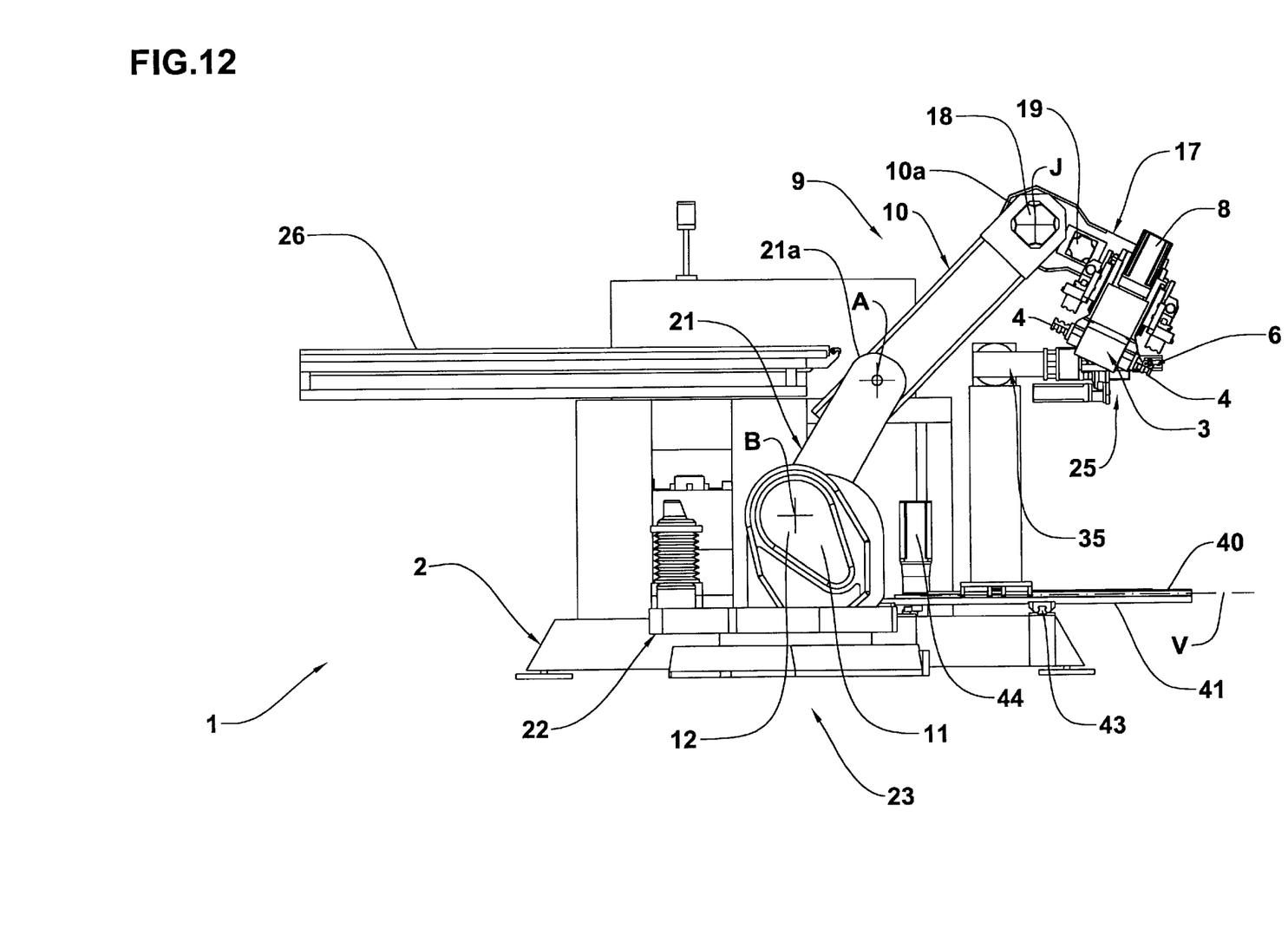
FIG. 12 is a partial elevation and side view of the machine in FIG. 11.

In a third embodiment, viewed from FIGS. 11 and 12, the first support arm 10 is mounted on an auxiliary arm 21 at a first end 21a of the auxiliary arm 21 itself; in turn, the auxiliary arm 21 is hinged at its second end 21b, opposite to the first one 21a, on a fixed base 22 placed close to the base frame 2. The auxiliary arm 21 together with the first and second support arms 10, 17, defines a multi-axis robot arm 23.

In particular, the first arm 10 is movable relative to the auxiliary arm 21 around a first rotation axis A parallel to the first articulation axis J and the auxiliary arm 21 is hinged on the fixed base 22 at a second rotation axis B, parallel to the first articulation axis J as well. The first actuating means 11 is operatively active around the first rotation axis A, to rotate the first support arm 10 relative to the auxiliary arm 21, whereas the second actuating means 12 is operatively active around the second rotation axis B, to rotate the auxiliary arm 21 relative to the fixed base 22. The robot arm 23 is thus able to move axis Z of the bending head 3 in a vertical plane perpendicular to the two rotation axes A, B which are horizontal and parallel to each other and to the two articulation axes J, K, irrespective of the movements carried out by the support arms 10, 17, auxiliary arm 21 and head 3.

Figure 13:
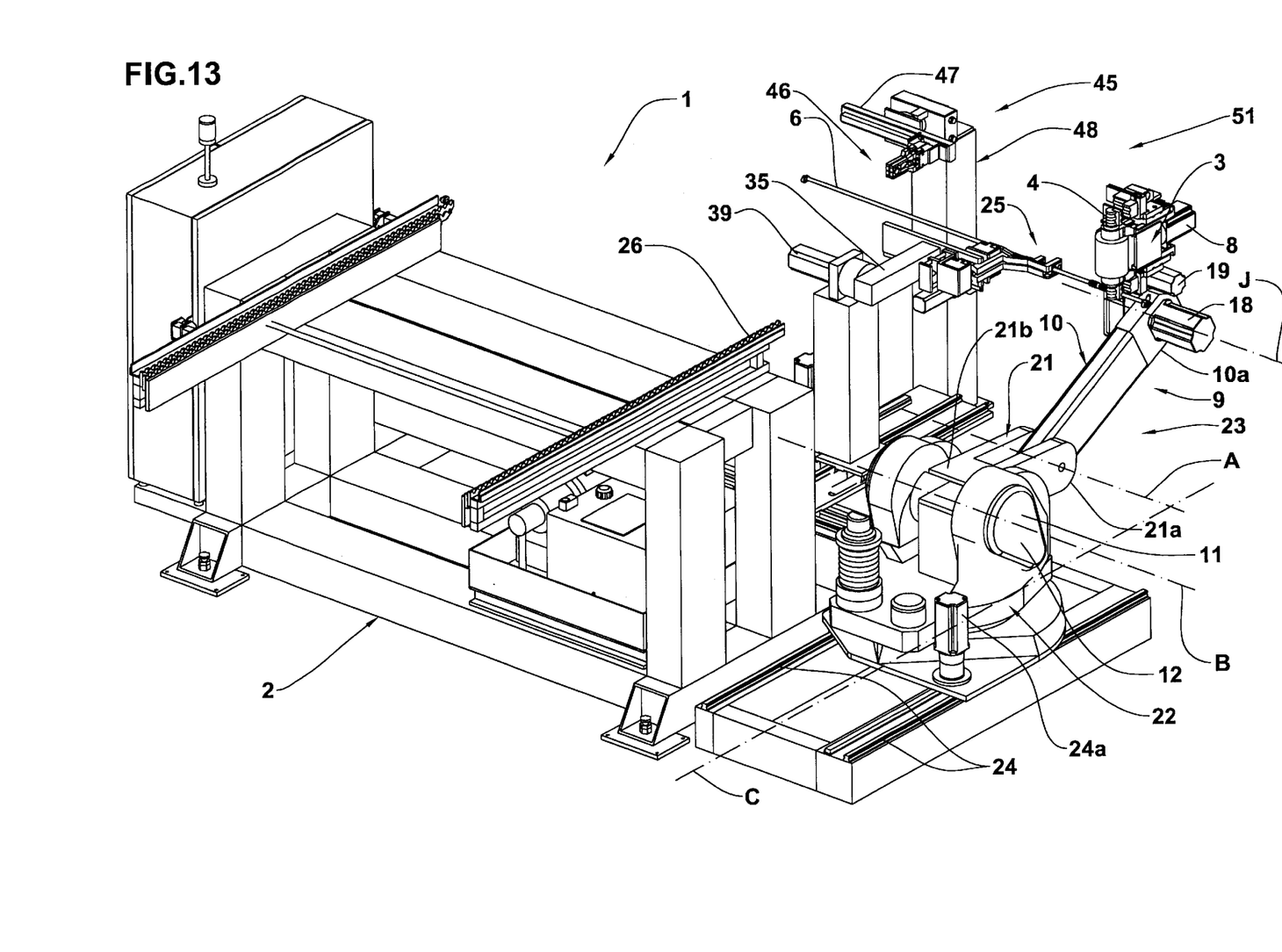
FIG. 13 is a perspective view of a fourth embodiment of the draw-bending machine in accordance with the invention, seen according to arrow C in FIG. 1.

Finally, in a fourth embodiment shown in FIGS. 12 and 13, the base 22 of the robot arm 23 as described in the third embodiment is slidably mounted on sliding guides 24 that, through an appropriate motor 24a, enable movement thereof along a translation direction C parallel to the ground and perpendicular to the two rotation axes A, B and the two articulation axes J, K.

Thus, in the last-mentioned configuration too, axis Z of the bending head 3 stays parallel to a vertical plane perpendicular to the four axes A, B, J, K, irrespective of the movements carried out by the support arms 10, 17, auxiliary arm 21, base 22 and head 3.

The bending machine 1 further comprises (FIGS. 5 and 6) a first gripping unit 25 for the pipe 6 to be bent which has a dual function, i.e. of picking up the pipe 6 from an appropriate feeding device 26 (FIGS. 1, 9, 11 and 13) to bring it to an operating space that can be reached by the bending head 3, and of supporting the pipe during the bending operation.

The first gripping unit 25 is formed of two clamps 27, 28 disposed in such a manner as to hold the pipe 6 to be bent at two regions spaced apart from each other and with the longitudinal pipe axis disposed perpendicular to the bending axis Z, therefore in the right position for being engaged between the bending die 4 and locking jaw 7.

In fact, the first clamp 27 is aligned with the second clamp 28 along a first alignment direction P that, when clamps 27, 28 tighten pipe 6, is coincident with the longitudinal axis of the pipe itself. This first alignment direction P is perpendicular to the bending axis Z or, more specifically, to the plane in which the support and positioning device 9 shifts the bending axis Z.

Figure 1:
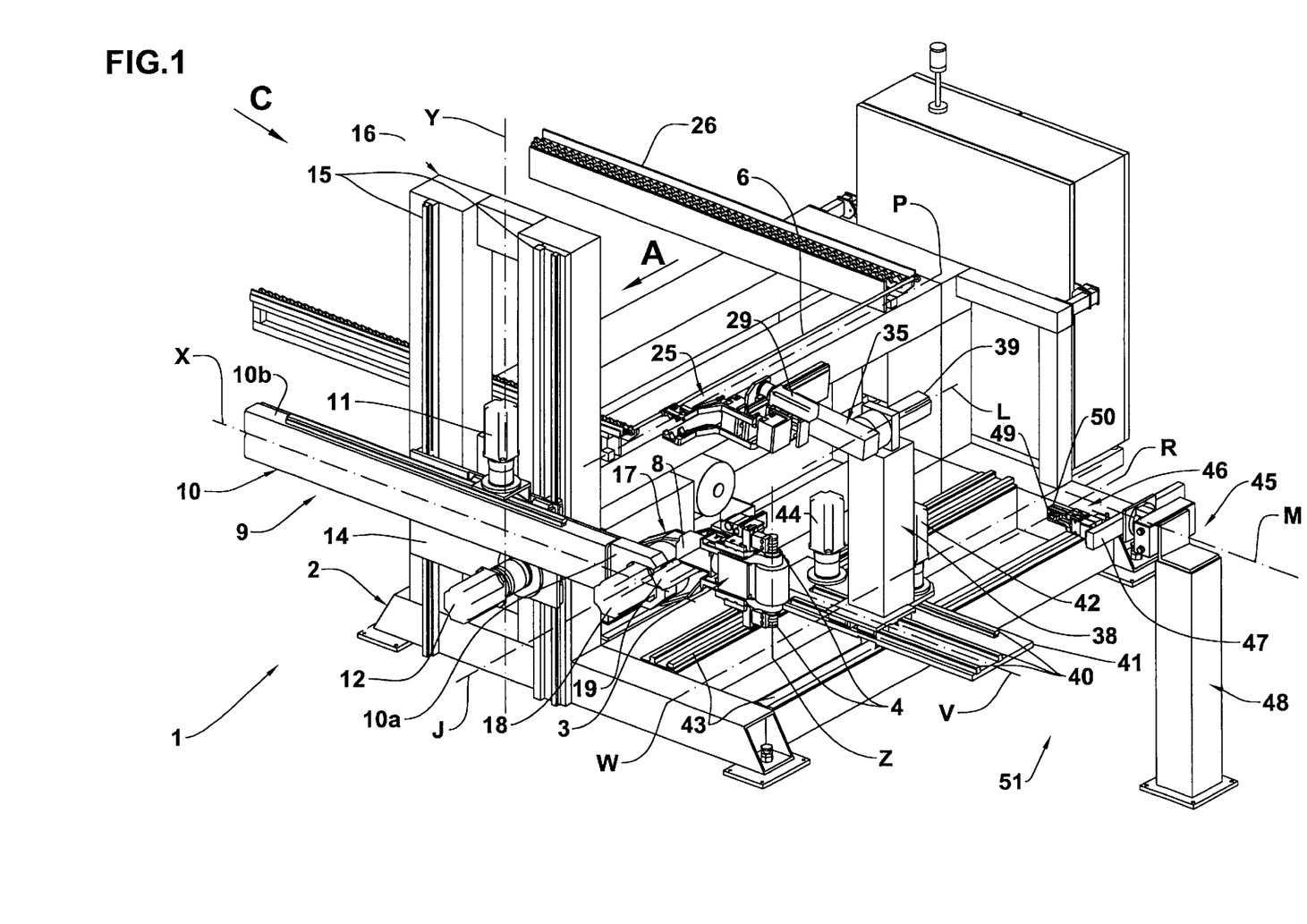
FIG. 1 is a perspective view of a draw-bending machine according to a first embodiment of the invention.

In addition the second clamp 28 is movable along said first direction P, close to or away from the first clamp 27, through fifth actuating means 29 shown in FIGS. 1 and 2, to enable gripping of pipe 6 at two positions disposed a varying axial distance from each other.

Each clamp 27, 28 comprises two arms 30, 31 (FIGS. 5 and 6), movable between a first position in which they are spaced apart from each other and a second position in which they are close to each other to tighten the interposed pipe 6.

Each arm 30, 31 at an end 30a, 31a thereof has at least one gripping cavity 32 (FIG. 6) the shape of which matches that of the pipe 6 to be tighten. When the two arms 30, 31 are close to each other, the mating cavities 32 form a passage for pipe 6.

The first gripping unit 25 is therefore able to support a pipe 6 made up of two rigid portions connected by a median flexible stretch at appropriate connecting fittings. In fact, each clamp 27, 28 tightens one of the rigid portions close to its connection with the flexible stretch and the mutual distance of said clamps can be adjusted based on the length of the flexible stretch itself.

In addition, arms 30, 31 in the first clamp 27 are provided with gripping ends 30a, 31a, each of which is provided with two cavities of different radius 32a, 32b so that pipe 6 can be clamped both on its nominal diameter and on the diameter of the connecting fitting.

To alternately align the first or second cavities, 32a or 32b, with the second clamp 28, the first clamp 27 is also movable along a second alignment direction Q perpendicular to the first alignment direction P.

Figure 5:
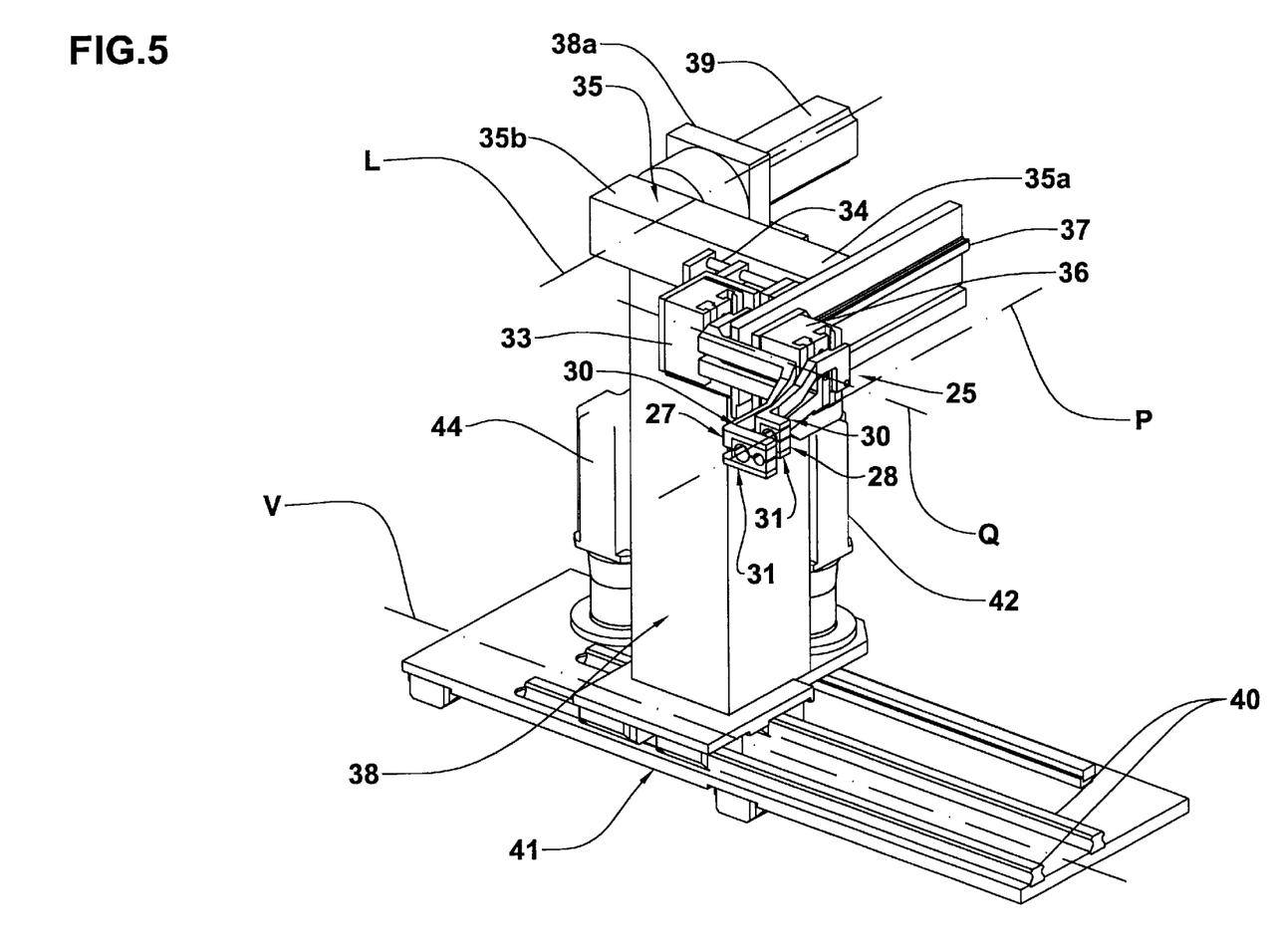
FIG. 5 is a perspective view of a second detail of the machine in FIG. 1.
Figure 6:
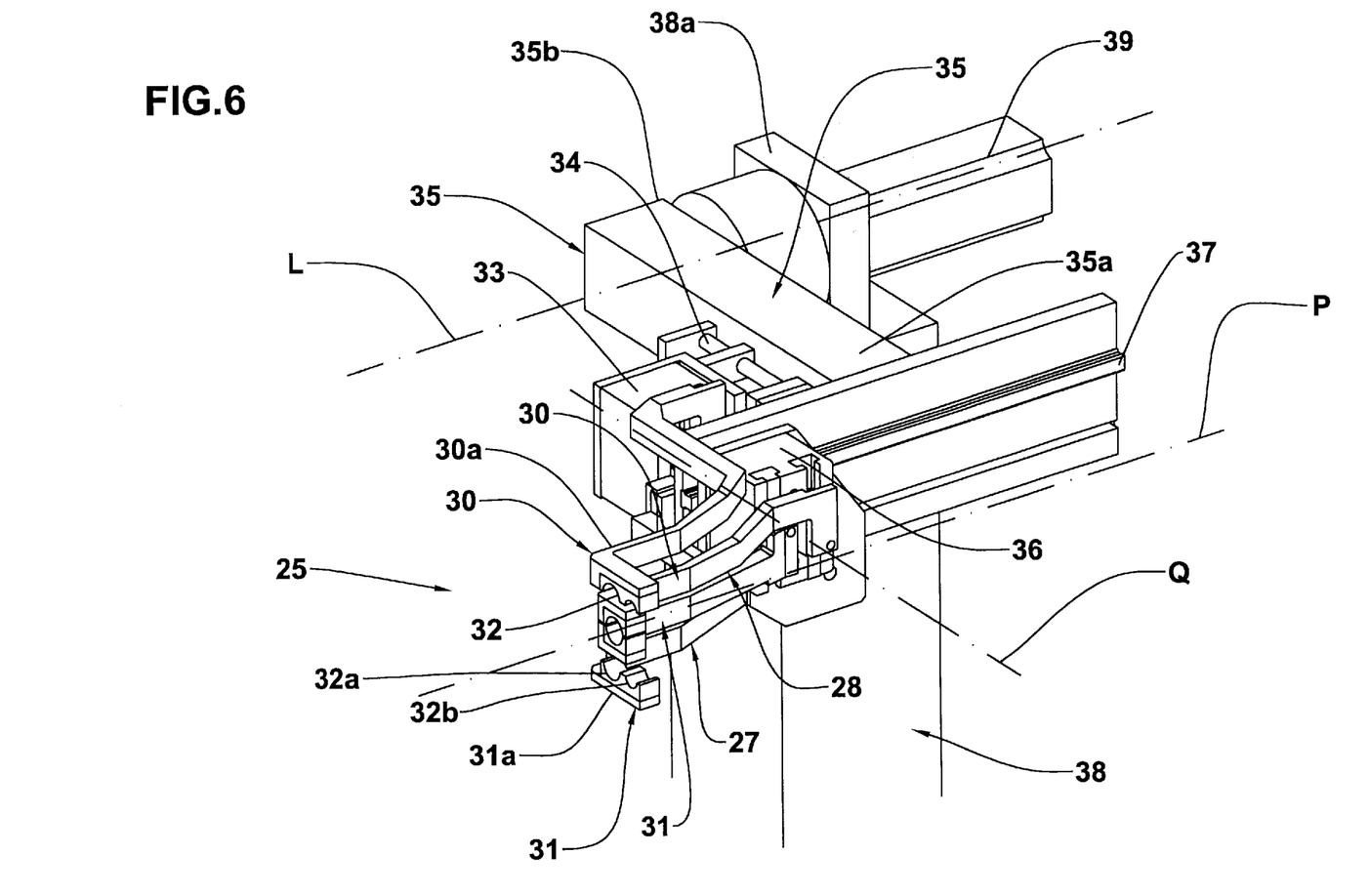
FIG. 6 is a perspective view of the detail in FIG. 4 to an enlarged scale.

As clearly viewed from FIGS. 5 and 6, the first clamp 27 is mounted on a first platform 33 movable on first rails 34 integral with a third support arm 35 and oriented along the second alignment direction Q.

The second clamp 28 is mounted on a second platform 36 slidable on at least one second rail 37 integral with the third arm 35 and oriented along the first alignment direction P.

It is to be pointed out that the two clamps 27, 28 can be also used as a single clamp, since the second clamp 28, as clearly shown in FIG. 6, can be also positioned between the open ends 30a, 31a of the arms of the first clamp 27.

Advantageously, the third support arm 35 has a first end 35a to which the first gripping unit 25 is fastened, and a second end 35b rotatably linked to the end 38a of a first support column 38 (FIG. 5).

The third support arm 35 is able to rotate, through appropriate sixth actuating means 39, around a third articulation axis L located at the second end 35b, for orientation of the gripping unit 25.

The first column 38 is in engagement with third horizontal rails 40 of a third platform 41 enabling translation of column 38 through seventh actuating means 42 along a first movement direction V.

Figure 14:
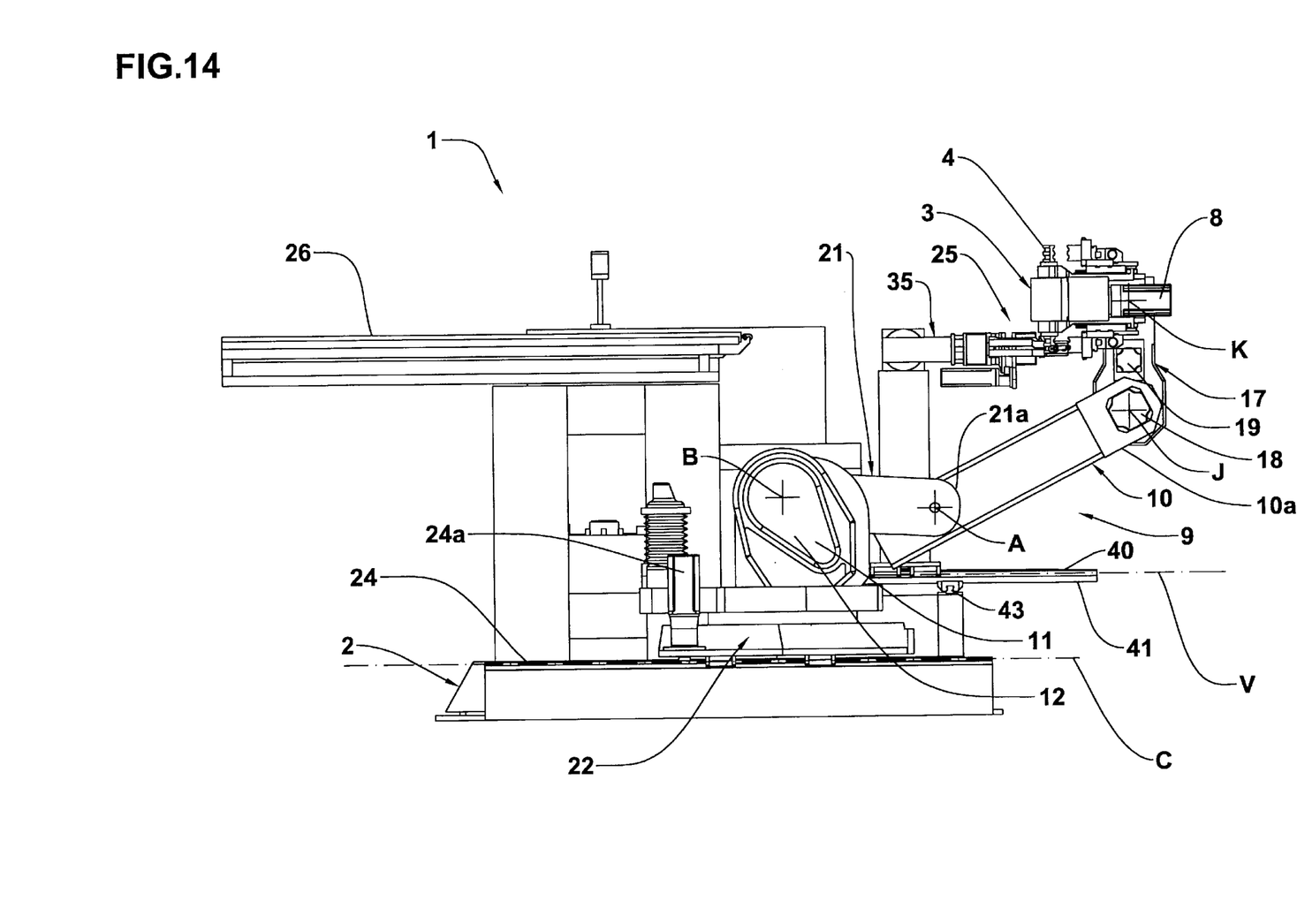
FIG. 14 is a partial elevation and side view of the machine in FIG. 13.

In the first embodiment (FIGS. 1, 2, 7 and 8) the first movement direction V is parallel to the first translation direction X; in the second embodiment (FIGS. 9 and 10) the first movement direction V is perpendicular to the rotation axis I; finally, in the third embodiment (FIGS. 11 and 12) and fourth embodiment (FIGS. 13 and 14) said first movement direction V is perpendicular to the two rotation axes A, B.

The third platform 41 is in turn in engagement with fourth horizontal rails 43 integral with the base frame 2 and extending at right angles to the third horizontal rails 40. Therefore the first column 38, through the fourth rails 43 and eighth actuating means 44 (FIGS. 1 and 5) dedicated thereto, can also move along a second movement direction W perpendicular to the first movement direction V.

Advantageously, the third articulation axis L is parallel to the first alignment direction P and the second movement direction W so that pipe 6 picked up from the feeding device 26 moves always parallel to itself.

Thus, irrespective of the position to which pipe 6 is moved by the gripping unit 25, said pipe always keeps a correct orientation to enable the bending head 3 to reach it.

The draw-bending machine 1 finally comprises a rotation unit 45 (FIGS. 1, 9, 11 and 13) to rotate pipe 6 through 180° and enable the bending head 3 to bend both ends of the pipe 6 itself with ease.

The rotation unit 45 consists of a second gripping unit 46 mounted on a fourth support arm 47 in turn rotatably mounted on a second fixed support column 48 put close to the base frame 2.

In particular, like the first gripping unit 25, the second gripping unit 46 as well comprises a third clamp 49 in alignment with a fourth clamp 50 along a third alignment direction R that, when clamps 49, 50 tighten pipe 6, is coincident with the longitudinal axis of the pipe 6 itself.

In the embodiment shown the second gripping unit 46 and fourth support arm 47 rotate about a fourth articulation axis M perpendicular to the third alignment direction R.

The second gripping unit 46 is movable through an angle of 180°, between two opposite positions in which the third alignment direction R and consequently the longitudinal axis of pipe 6, is parallel to the first alignment direction P.

The first 25 and second 46 gripping units together with the structures connected therewith, therefore constitute the handling and locking means 51 for the pipes 6 being worked.

After describing the invention mainly from a structural point of view, a pipe bending method being part of the present invention is now set out.

After arrangement of pipes 6 to be bent in the feeding device 26, the first gripping unit 25 is moved close to the feeding device 26 and said unit, by means of clamps 27, 28, picks a pipe 6 up disposing the longitudinal axis of the pipe 6 itself along the first alignment direction P.

Subsequently, through rotation about the third articulation axis L and translation along the first V and second W movement directions, the first gripping unit 25 brings pipe 6 still parallel to itself into the operating space that can be reached by the bending head 3.

The support and positioning device 9 moves the bending head 3 until engagement of pipe 6 between one of the two bending dies 4, the respective presser element 5 and the locking jaw 7, the two last-mentioned elements being spaced apart from die 4.

During this movement, the head 3 and related bending axis Z are inclined in a first reference direction Z' selected on the basis of the plane in which the curve must lie. In fact, the bending plane, i.e. the plane in which the elbow shape to be formed on pipe 6 lies, is the plane perpendicular to the bending axis Z.

The locking jaw 7 and presser element 5 move close to die 4 to tighten pipe 6, and subsequently the die 4 and locking jaw 7 rotate with respect to the presser element 5 around the bending axis Z to form the curve or bend.

If a second curve is wished to be made in a plane different from the plane in which the first was made, after releasing pipe 6 from clamping and bringing die 4 back to the starting position, the working cycle involves moving of the bending head 3 away from pipe 6, axial sliding of the pipe 6 itself to change the bending region, and subsequent moving of the bending head 3 close to the pipe according to a second reference direction Z" different from the first one Z'.

Due to the machine structure, the reference directions Z', Z" according to which axis Z is inclined stay in a plane perpendicular to the first alignment direction P.

Figure 7:
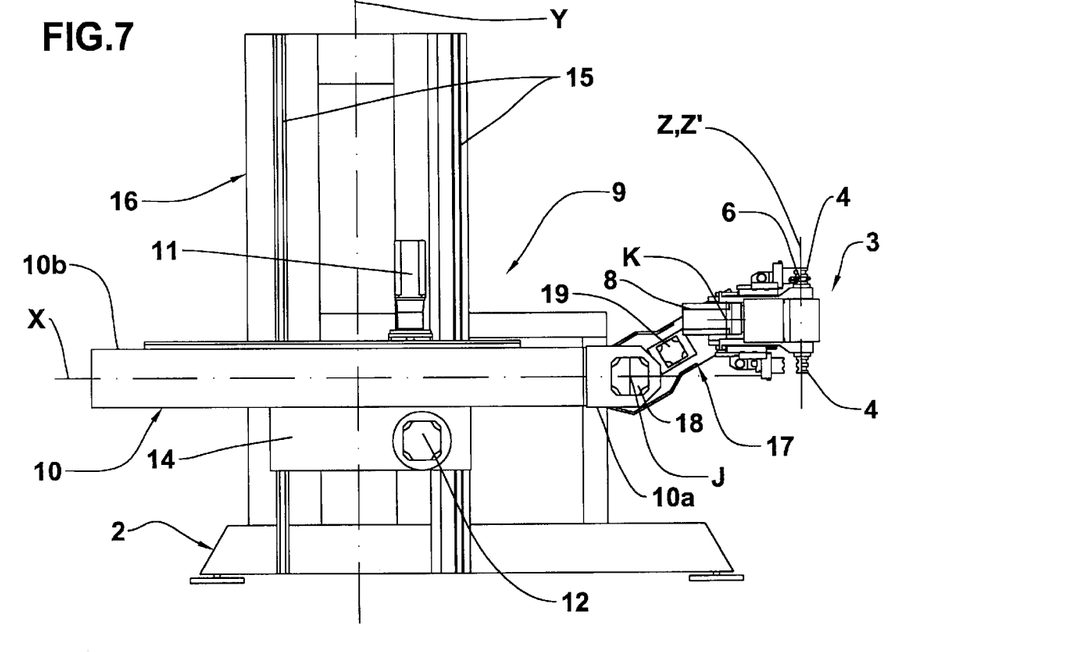
FIG. 7 is an elevation side view of the machine shown in FIG. 1 during execution of a first bending.
Figure 8:
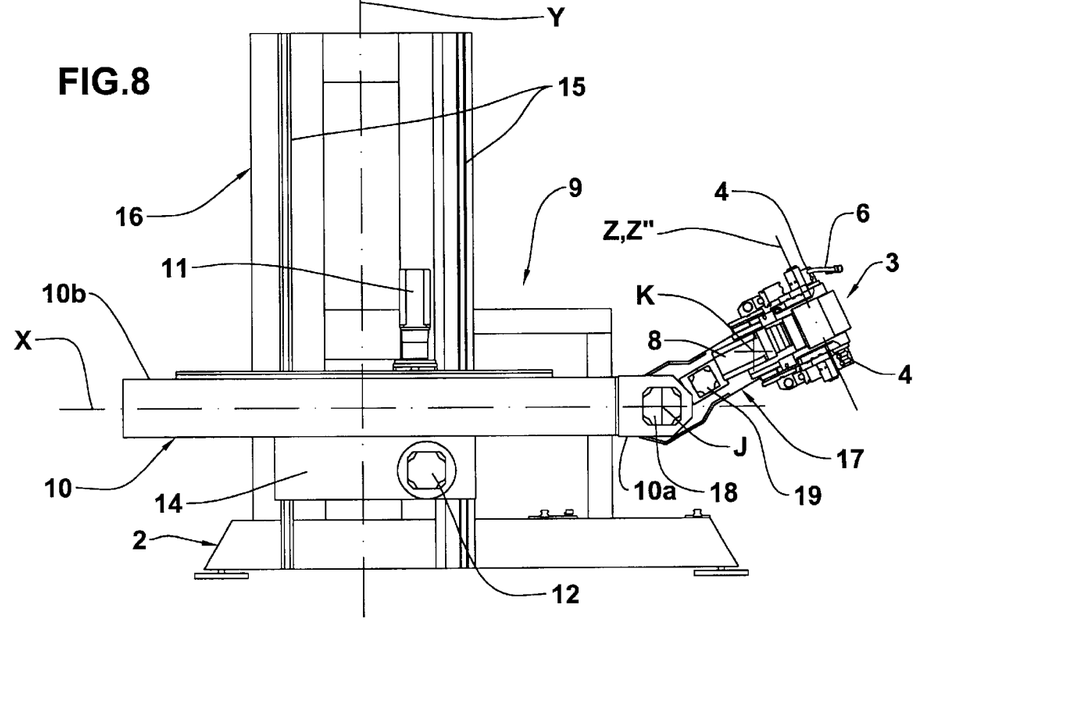
FIG. 8 is an elevation side view of the machine in FIG. 2 during execution of a second bending.

In particular, with reference to the first embodiment shown in FIGS. 7 and 8, after the first gripping unit 25 has moved pipe 6 towards the bending head 3 through sliding on the fourth horizontal rails 43 (FIG. 1), in order to move from the position shown in FIG. 7 to that shown in FIG. 8, the first support arm 10, lowers along the second vertical translation direction Y for example, and the bending head 3 rotates until it gets into alignment with the second support arm 17.

In any case it should be noted that, due to the great number of degrees of freedom of the machine 1, a given relative position between the bending head 3 and pipe 6 is not unequivocally determined. In fact, a given plane of bending with innumerable positions of the movable members of the machine 1 can be obtained on pipe 6.

Practically pipe 6 during the bending step, can be disposed at any axial position parallel to the first alignment direction P, whereas in the prior art, on the contrary, pipe 6 always keeps a single position in an axial direction.

If a portion of pipe 6 close to the opposite end is wished to be bent, the handling and locking means 51 is able to rotate pipe 6 through 180°. In particular, after moving apart the bending head 3, the first gripping unit 25 brings pipe 6 close to the second gripping unit 46 of the rotation unit 45. The second gripping unit 46 grasps pipe 6 and, through rotation through 180° around the fourth articulation axis M, turns it over and returns it to the gripping unit 25 to bring the unworked end towards the bending head 3.

The invention achieves important advantages.

It should be first of all pointed out that the draw-bending machine in accordance with the present invention enables pipes made up of two rigid portions connected together by a flexible stretch to be bent in different planes.

In fact, the particular structure of the first gripping unit allows the two rigid portions of the pipe to be grasped irrespective of the length of the flexible stretch whereas the bending head is able to rotate around the fixed pipe to form curves in any wished and intended plane.

Therefore, pipe testing in order to check the pipe tightness can be carried out on the assembled pipe still in a rectilinear condition, which will bring about a reduction in time and costs.

The machine in accordance with the invention therefore enables passage from the assembled components not yet bent to the finished product without being obliged to store bent pipes before assembling. In this way there is no risk of each bent rigid pipe being damaged during storage and subsequent picking up for assembling.

It should be finally appreciated that the draw-bending machine of the invention enables the same bending head moved by the support and positioning device to be also used to discharge the finished pipe into an unloading area selected each time, or even into a further working station.

What is claimed is:

1. A draw-bending machine comprising:
   a base frame (2);
   a bending head (3) movably in engagement with the base frame (2) and including at least one bending die (4) rotatable about a bending axis (Z);
   a support and positioning device (9) of said at least one bending head (3), said support and positioning device (9) being linked to the base frame (2);
   handling and locking means (51) for a pipe (6) to be bent;
   the support and positioning device (9) of said at least one bending head (3) presenting:
   a first support arm (10) movably in engagement with the base frame (2), said first support arm (10) having a first end (10*a*) and a second end (10*b*) opposite to the first end (10*a*);

first actuating means (11) of the first support arm (10);
second actuating means (12) of the first support arm (10);
a second support arm (17) having a first end (17a) hinged on the first end (10a) of the first support arm (10) at a first articulation axis (J) and a second end (17b) hinged on the bending head (3) at a second articulation axis (K);
third actuating means (18) of the second support arm (17) around the first articulation axis (J);
fourth actuating means (19) of the bending head (3) around the second articulation axis (K);
the draw-bending machine being characterized in that the handling and locking means (51) for the pipe (6) to be bent comprises a first gripping unit (25) having first (27) and second (28) clamps aligned along a first alignment direction (P) spaced along the axis of the pipe to tighten the pipe (6) to be bent at two regions spaced apart from each other.

2. The draw-bending machine as claimed in claim 1, wherein the first support arm (10) is movable relative to the base frame (2) along a first translation direction (X) and along a second translation direction (Y) perpendicular to the first translation direction (X).

3. The draw-bending machine as claimed in claim 2, wherein the first actuating means (11) of the first support arm (10) is operatively active along the first translation direction (X) and the second actuating means (12) of the first support arm (10) is operatively active along the second translation direction (Y).

4. The draw-bending machine as claimed in claim 2, wherein the first translation direction (X) is horizontal to a resting surface of the base frame (2) and the second translation direction (Y) is vertical to the resting surface of the base frame (2).

5. The draw-bending machine as claimed in claim 1, wherein the second articulation axis (K) is parallel to the first articulation axis (J).

6. The draw-bending machine as claimed in claim 2, wherein said first (J) and second (K) articulation axes are perpendicular to both the first (X) and second (Y) translation directions.

7. The draw-bending machine as claimed in claim 2, wherein the bending axis (Z) lies in a plane parallel to both the first translation axis (X) and the second translation axis (Y).

8. The draw-bending machine as claimed in claim 1, wherein the first support arm (10) is movable relative to the base frame (2) about a rotation axis (I) and along a translation direction (U) perpendicular to the rotation axis (I).

9. The draw-bending machine as claimed in claim 8, wherein the translation direction (U) is coincident with the longitudinal extension of the first support arm (10).

10. The draw-bending machine as claimed in claim 8 or 9, wherein the first actuating means (11) of the first support arm (10) is operatively active along the translation direction (U) and the second actuating means (12) of the first support arm (10) is operatively active around the rotation axis (I).

11. The draw-bending machine as claimed in claim 8, wherein the rotation axis (I) is horizontal to a resting surface of the base frame (2).

12. The draw-bending machine as claimed in claim 8, wherein said first (J) and second (K) articulation axes are parallel to the rotation axis (I).

13. The draw-bending machine as claimed in claim 8, wherein the bending axis (Z) lies in a plane perpendicular to the rotation axis (I).

14. The draw-bending machine as claimed in claim 1, further comprising:
an auxiliary arm (21) hinged on the first support arm (10) at a first rotation axis (A);
a fixed base (22) placed close to the base frame (2);
the auxiliary arm (21) being in addition hinged on the fixed base (22) at a second rotation axis (B).

15. The draw-bending machine as claimed in claim 14, wherein the first actuating means (11) is operatively active around the first rotation axis (A) to rotate the first support arm (10) relative to the auxiliary arm (21), and the second actuating means (12) is operatively active around the second rotation axis (B) to rotate the auxiliary arm (21) relative to the fixed base (22).

16. The draw-bending machine as claimed in claim 14, wherein the first rotation axis (A) and second rotation axis (B) are horizontal to the resting surface of the base frame (2) and parallel to each other.

17. The draw-bending machine as claimed in claim 14, wherein the first rotation axis (A), second rotation axis (B), first articulation axis (J) and second articulation axis (K) are parallel to each other.

18. The draw-bending machine as claimed in claim 14, wherein the bending axis (Z) lies in a plane perpendicular to the first rotation axis (A) and the second rotation axis (B).

19. The draw-bending machine as claimed in claim 14, further comprising sliding guides (24) oriented along a translation direction (C) horizontal to the resting surface of the base frame (2) and perpendicular to the first rotation axis (A), second rotation axis (B), first articulation axis (J) and second articulation axis (K).

20. The draw-bending machine as claimed in claim 1, wherein the bending head further comprises:
at least one presser element (5) active on said pipe (6) against the action of said die (4);
at least one locking jaw (7) rotatably movable at the bending axis (Z) together with the die (4), said locking jaw (7) being movable between a first position in which it is spaced apart from the die (4), and a second position in which it is close to the die (4) to tighten the pipe (6) to be bent.

21. The draw-bending machine as claimed in claim 1, wherein the first alignment direction (P) is perpendicular to the bending axis (Z).

22. The draw-bending machine as claimed in claim 1, wherein the second clamp (28) is movable close to or away from the first clamp (279 along said first alignment direction (P).

23. The draw-bending machine as claimed in claim 1, wherein the handling and locking means (51) further comprises:
a first support column (38) mounted on the base frame (2) and provided with an end (38a);
a third support arm (35) having a first end (35a) and a second end (35b) opposite to the first one; the first gripping unit (25) being fastened to the first end (35a) of the third support arm (35); the second end (35b) of the third support arm (35) being rotatably linked to the end (38a) of the first column (38) at a third articulation axis (L);
sixth actuating means (39) of the third arm (35) around the third articulation axis (L).

24. The draw-bending machine as claimed in claim 23, wherein the first support column (38) is movable along a first movement direction (V) and along a second movement direction (W) perpendicular to the first movement direction (V).

25. A method of bending pipes comprising the following steps:

positioning a pipe (6) to be bent within an operating space to be reached by a bending head (3) defining a bending axis (Z); the longitudinal axis of said pipe (6) being disposed along a first alignment direction (P); the bending axis (Z) lying in a plane perpendicular to the first alignment direction (P);

shifting the bending head (3) a first time to engage the pipe (6) to be bent;

inclining the bending axis (Z) in a first reference direction (Z') to bend the pipe (6) in a plane perpendicular to said first reference direction (Z');

bending the pipe (6) around the bending axis (Z);

moving the head (3) away from the pipe (6);

axially shifting the pipe (6) along the first alignment direction (P) to change the bending region on said pipe (6);

shifting the bending head (3) at least a second time to engage the pipe (6) to be bent;

inclining the bending axis (Z) at least in a second reference direction (Z") distinct from the first one (Z') to bend the pipe (6) in a plane perpendicular to said second reference direction (Z');

bending the pipe (6) around the bending axis (Z);

wherein the step of positioning the pipe (6) to be bent involves the steps of:

adjusting the mutual distance of a first clamp (27) and of a second clamp (28) of a first gripping unit (25), said first clamp (27) and second clamp (28) being aligned along the first alignment direction (P);

gripping the pipe (6) to be bent with each clamp (27, 28) at two positions disposed a varying axial distance from each other, in order to tighten the pipe (6) at two regions spaced apart from each other;

moving the pipe (6) gripped by the gripping unit (25) within the operating space.

* * * * *